United States Patent [19]
Janson et al.

[11] Patent Number: 5,729,608
[45] Date of Patent: Mar. 17, 1998

[54] METHOD AND SYSTEM FOR PROVIDING SECURE KEY DISTRIBUTION IN A COMMUNICATION SYSTEM

[75] Inventors: Philippe Janson, Waedenswil; Gene Tsudik, Thalwil, both of Switzerland

[73] Assignee: International Business Machines Corp., Armonk, N.Y.

[21] Appl. No.: 591,638

[22] PCT Filed: Jul. 27, 1993

[86] PCT No.: PCT/EP93/01989

§ 371 Date: Jan. 24, 1996

§ 102(e) Date: Jan. 24, 1996

[87] PCT Pub. No.: WO95/04416

PCT Pub. Date: Feb. 9, 1995

[51] Int. Cl.$^6$ ............................................. H04L 9/32
[52] U.S. Cl. ................................................. 380/21; 380/30
[58] Field of Search .................................... 380/21, 28, 30, 380/25

[56] References Cited

U.S. PATENT DOCUMENTS

| | | |
|---|---|---|
| 4,649,233 | 3/1987 | Bass et al. |
| 5,124,117 | 6/1992 | Tatebayashi et al. .......... 380/21 |
| 5,222,140 | 6/1993 | Beller et al. .................. 380/30 |
| 5,251,258 | 10/1993 | Tanaka ......................... 380/21 |
| 5,369,705 | 11/1994 | Bird et al. .................... 380/21 |

FOREIGN PATENT DOCUMENTS 0197392  3/1986  European Pat. Off.

OTHER PUBLICATIONS

Computer Security—Esorics 92.Second European Symposium on Research in Computer Security Proceedings, Nov. 23-25, 1992, Toulouse, France; ∎Kryptoknight Authentication and Key Distribution System∎, R. Molva et al. pp. 155–174.

IEEE Journal on Selected Areas in Communication, vol. 11, No. 5, Jun. 1993, New York, ∎Systematic Design of a Family of Attack–Resistant Authentication Protocols∎, R. Bird et al, pp. 679–693.

*Primary Examiner*—Gilberto Barrón, Jr.
*Attorney, Agent, or Firm*—Jeanine S. Ray-Yarletts

[57] ABSTRACT

A method and system for providing secure authenticated cryptographic key distribution in a communication system having properties very similar to a Two-Party Authentication Protocol. A new group key is distributed by a server to a selected group of users in the system. A braided structure of the messages, sent by the server to each user, allows authentication and, at the same time, secure and secret key distribution. Moreover, the braided structure makes it possible to construct minimal-length protocol messages.

22 Claims, 11 Drawing Sheets

| 201 | A => B | A, $N_{ab}$ |
| 202 | B => A | AUTH($K_{ab}$, $N_{ab}$, $N_{ba}$, B), $N_{ba}$ |
| 203 | A => B | ACK($K_{ab}$, $N_{ab}$, $N_{ba}$) |

Fig. 2

| 401 | A => B | A, $N_{ab}$ |

| 402 | B => A | AUTH($K_{ab}, N_{ab}, K_{ba}, B$), BRAID($K_{ab}, \hat{N}_{ba}, K_{ba}$) |

| 403 | A => B | ACK($K_{ab}, N_{ab}, K_{ba}$) |

Fig. 4

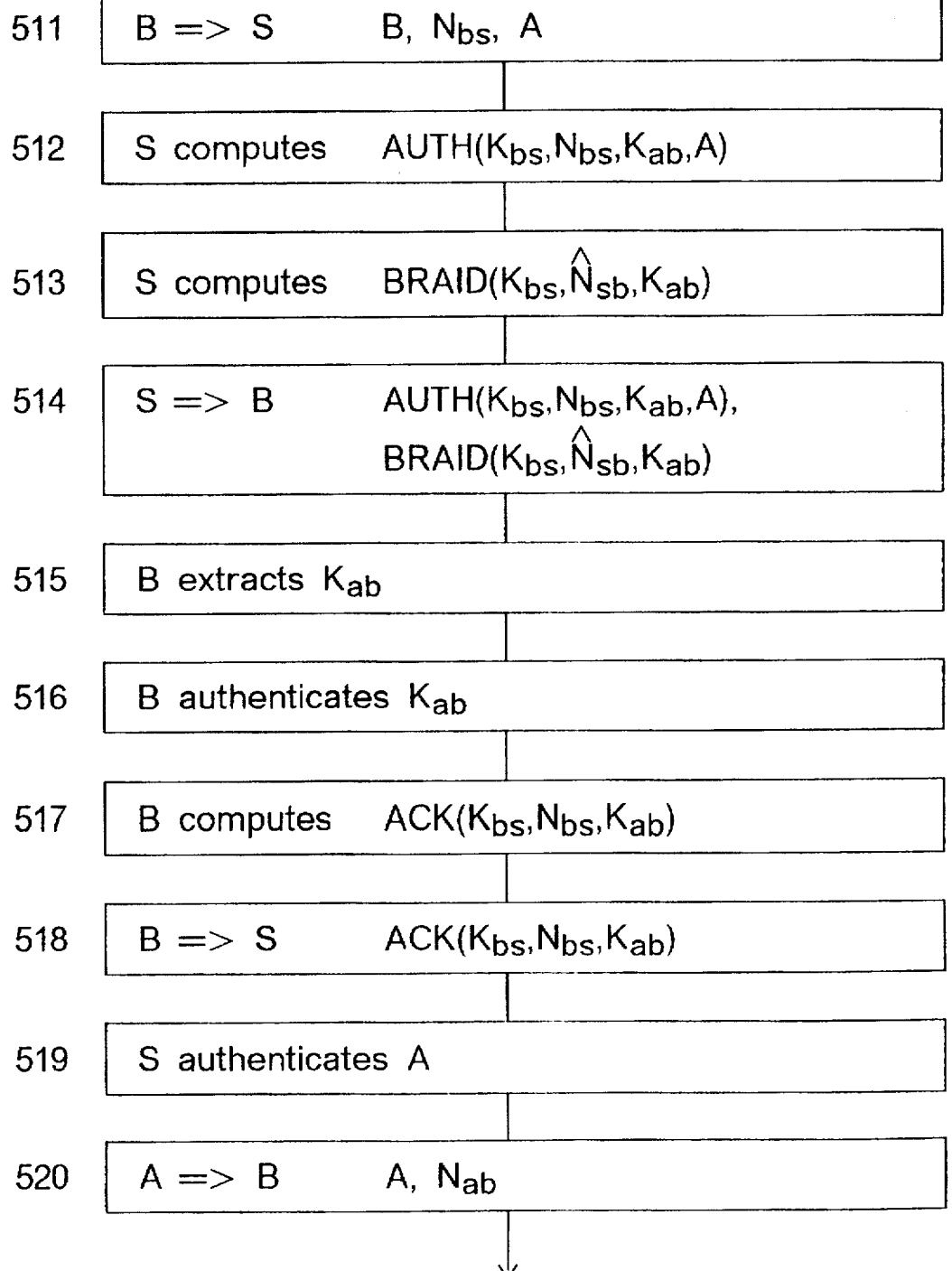

METHOD AND SYSTEM FOR PROVIDING SECURE KEY DISTRIBUTION IN A COMMUNICATION SYSTEM

TECHNICAL FIELD

The present invention relates in general to secure communication systems and in particular to secure cryptographic key distribution in a communication system. Still more particularly, this invention relates to secure authenticated key distribution in a communication system.

BACKGROUND OF THE INVENTION

Authentication protocols and key distribution protocols are known in the art.

A two-party authentication protocol (hereafter simply referred to as 2PAP) is described in R. Bird, I. Gopal, A. Herzberg, P. Janson, S. Kutten, R. Molva, M. Young: Systematic Design of Two-Party Authentication Protocols, Proceeding of Crypto '91, August 1991. In the described 2PAP, two users authenticate each other by transmitting challenges and using a shared secret key. This protocol has been shown to be secure against an important class of attacks known as interleaving attacks. Such attacks are based upon the adversary's ability to use either:

- legitimate flows obtained from past executions of the protocol or
- protocol flows elicited by the adversary from legitimate parties.

A family of key distribution protocols (hereinafter simply referred to as KDP) has been subsequently realized in an actual network security service, KryptoKnight, described in R. Molva, G. Tsudik, E. Van Herreweghen, S. Zatti: KriptoKnight Authentication and Key Distribution Service, Proceeding of ESORICS 92, October 1992, Toulouse, France.

In a two-party key distribution protocol (hereinafter simply referred to as 2PKDP) a user distributes to another user a new secret key, using an already previously secret shared key.

In a three-party key distribution protocol (hereinafter simply referred to as 3PKDP) and in a multi-party key distribution protocol (hereinafter simply referred to as MPKDP), as described in U.S. Pat. No. 4,649,233, there is a user (often called "server") that shares a corresponding master user key with each of the other users; each master user key is known only to the server and the corresponding user. When a group of users (two or more) want to exchange secrets, since they do not share a common key, they have to rely on collaboration with the server. On request, the server generates and distributes a new group key for two (or more) selected users.

Key distribution is particularly difficult—because of time constraints—in communication system that provide for dynamic routing functions, enabling the continuation of routing, broadcasting, and multicasting (sending a message to a sub-set of users along a path or a set of paths) in the presence of changes. Such dynamic routing functions are per se known in the art, see for example Bertsekas-Gallager: Data Networks, Prentice-Hall, 1987, section 5.3.

SUMMARY OF THE INVENTION

There are some drawbacks with this prior art. The key distribution protocols known in the art have not been shown sufficiently secure; at least not insofar as the 2PAP described by Bird et al., i.e., they are believed but have not been shown to resist any kind of attacks such as inlet leaving attacks or cut-and-splice attacks, for instance.

In addition, some do not guarantee integrity of the key being distributed, i.e. they do not guarantee that the key being distributed cannot be modified by an adversary. These limitations are particularly true of protocols with minimal-length messages for secure authenticated key distribution.

The above drawbacks of the prior art are overcome by the invention as claimed.

The present invention provides a method and system that have been mathematically demonstrated to be as secure as 2PAP, in particular against interleaving attacks, owing to a braided structure of the protocol messages. The basic two-party key distribution (and authentication) protocol can in turn be used as a basic building block for constructing more elaborate, e.g. three-party, multi-party or inter-domain, key distribution protocols. The braided structure, in addition, guarantees the integrity of the key being distributed. Besides, this authenticated key distribution protocol requires minimal length protocol messages, and it is as compact as possible in both the number and the size of messages exchanged.

All this can be achieved with minimal computational requirements and without the necessity of using encryption/decryption functions.

The foregoing and other objects, features, and advantages of the invention will be apparent from the following more particular description of a preferred embodiment of the invention, as illustrated in the accompanying drawing.

DESCRIPTION OF THE DRAWINGS AND NOTATIONS USED

The invention is described in detail below with reference to the following drawings:

FIG. 2 depicts the 2PAP of the prior ad.

FIG. 4 depicts the message flow of an example of 2PKDP according to the present invention.

The following terminology is adopted throughout the description:

A,B,C: full user names; all names are assumed to be distinct. These names are, for example, 64-bit values obtained either by directly coding the identity or by applying a hash function to reduce the original coding of the name into a 64-bit field.

S: full name of the authentication server; S is a user assumed to be universally trusted by all constituent users.

$N_{ab}$: all symbols beginning with N are random challenges or nonces, i.e. unpredictable, used-only-once random numbers; created for that specific occasion unit of freshness information. The first letter of the subscript refers to the user that originated the nonce while the second letter in the subscript identifies the challenged target user (e.g., $N_{ab}$ is a nonce generated by A and sent to challenge B); $K_{ab}$: all symbols beginning with K are keys. The subscript letters identify the users sharing that key (e.g., $K_{ab}$ is the key shared between A and B); +e,crc ++ee : exclusive OR or XOR function.

$E_K$ (X): encryption of plaintext block X under key K. We use the term encryption to refer to a single-block transformation of cleartext input. This includes traditional encryption functions such as DES (described in National Bureau of Standards, Federal Information Processing Standards, National Bureau of Standards, Publication 46, 1977) as well as strong one-way functions (no one can invert) such as MD5, when the key is used as a suffix and/or prefix (described in R. Rivest: The MD5 Message Digest Algorithm, Internet DRAFT, July 1991). In the case of DES, both K and X are assumed to be not longer than the basic block size of the underlying encryption function, i.e. 64 bits. (Such assumptions are irrelevant for many one-way hash functions such as MD5, which accommodate any parameter size by definition.)

FUNC(x,y,z): cryptographic function dependent upon arguments x,y,z; a function may depend on all or only some of its arguments. All functions generate results of a size equal to the basic block size of the underlying cryptographic algorithm, e.g. 64 bits for DES, 128 for MD5, etc.

A→B X: this notation captures a single protocol flow; it denotes that A sent a message X to B.

DETAILED DESCRIPTION

Figure 1:
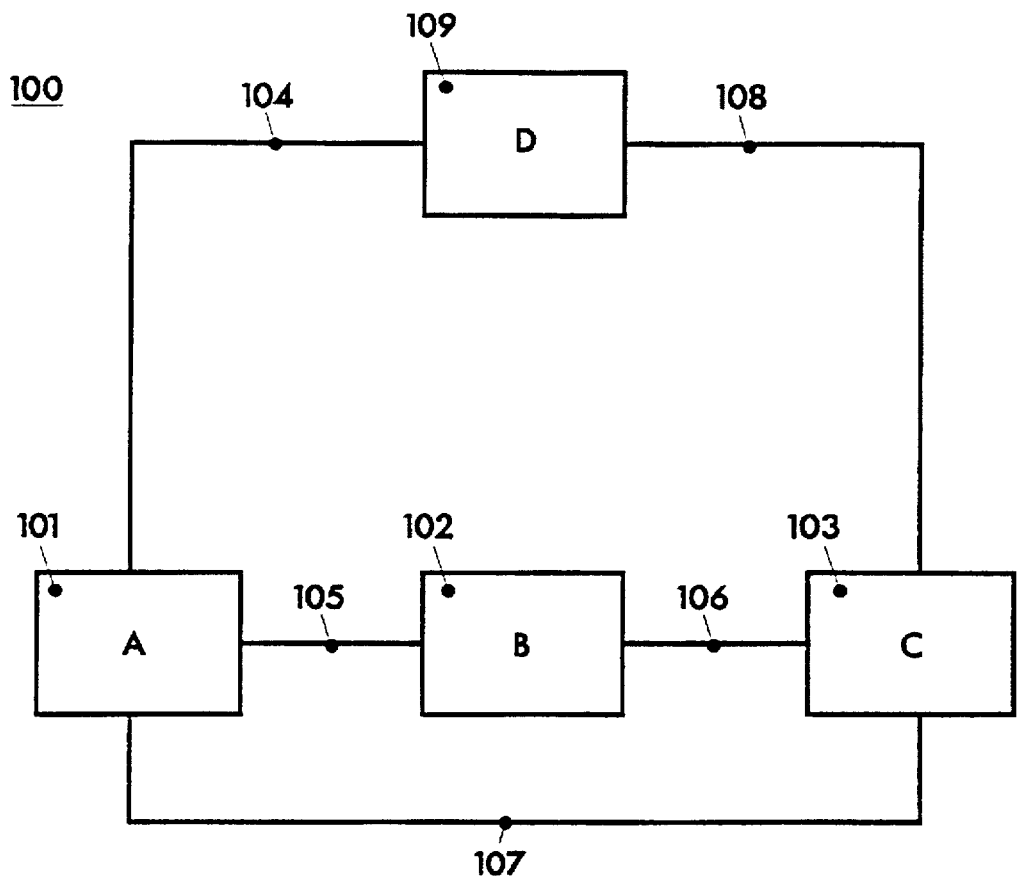
FIG. 1 is a pictorial representation of a communication system which may be utilized for the implementation of the method and system of the present invention.

With reference now to the figures and in particular with reference to FIG. 1, a communication system (100) is represented. Users A(101), B(102), C(103) can reside in various locations which are computers, terminals, local area networks, connected by a set of links (104, 105, 106, 107, 108). One (or more) of these users may work as a server S (109) for secure key distribution. A common method is that a table of master user keys is kept in safe storage at the server ($K_{as}$ is the master key shared by the server and a user whose identification is A; similarly $K_{bs}$ is the key shared with B, and so on). Each user can also have his master user key stored in its safe storage device (encrypted file, special hardware, a smart card, etc.).

FIG. 2 shows the basic secure 2PAP, described by Bird et al. in the prior art, between two users (A and B) sharing a common key $K_{ab}$. The protocol execution begins at block 201 with the initiator party A transmitting its identity A and a nonce $N_{ab}$ to the second user B. Upon receiving the message from A, the value of an authentication function AUTH($K_{ab},N_{ab},N_{ba}$,B), based upon the shared key the nonce $N_{ab}$, a new nonce $N_{ba}$ generated by B and the identity B of the message originator is computed by the second user B. Referring now to block 202, the value of this authentication function and the nonce $N_{ba}$ are transmitted from B to A. Upon receiving the message from B, the first user A re-computes the value of the authentication function AUTH ($K_{ab},N_{ab},N_{ba}$,B) and compares it with its counterpart in the message sent by B; a match results in authentication of B. The first user A then computes the value of another authentication function ACK($K_{ab},N_{ab},N_{ba}$), based upon the shared key $K_{ab}$, the nonce $N_{ab}$ and the nonce $N_{ba}$, in order to complete two-way authentication. Referring now to block 203, the value of the authentication function ACK($K_{ab},N_{ab}$, $N_{ba}$) is sent from A to B. Upon receiving the message from A, the user B re-computes the value of the authentication function ACK($K_{ab},N_{ab},N_{ba}$) and compares it with its counterpart in the message sent by A; a match results in authentication of A.

TWO-PARTY KEY DISTRIBUTION PROTOCOL
(2PKDP)

Figure 3:
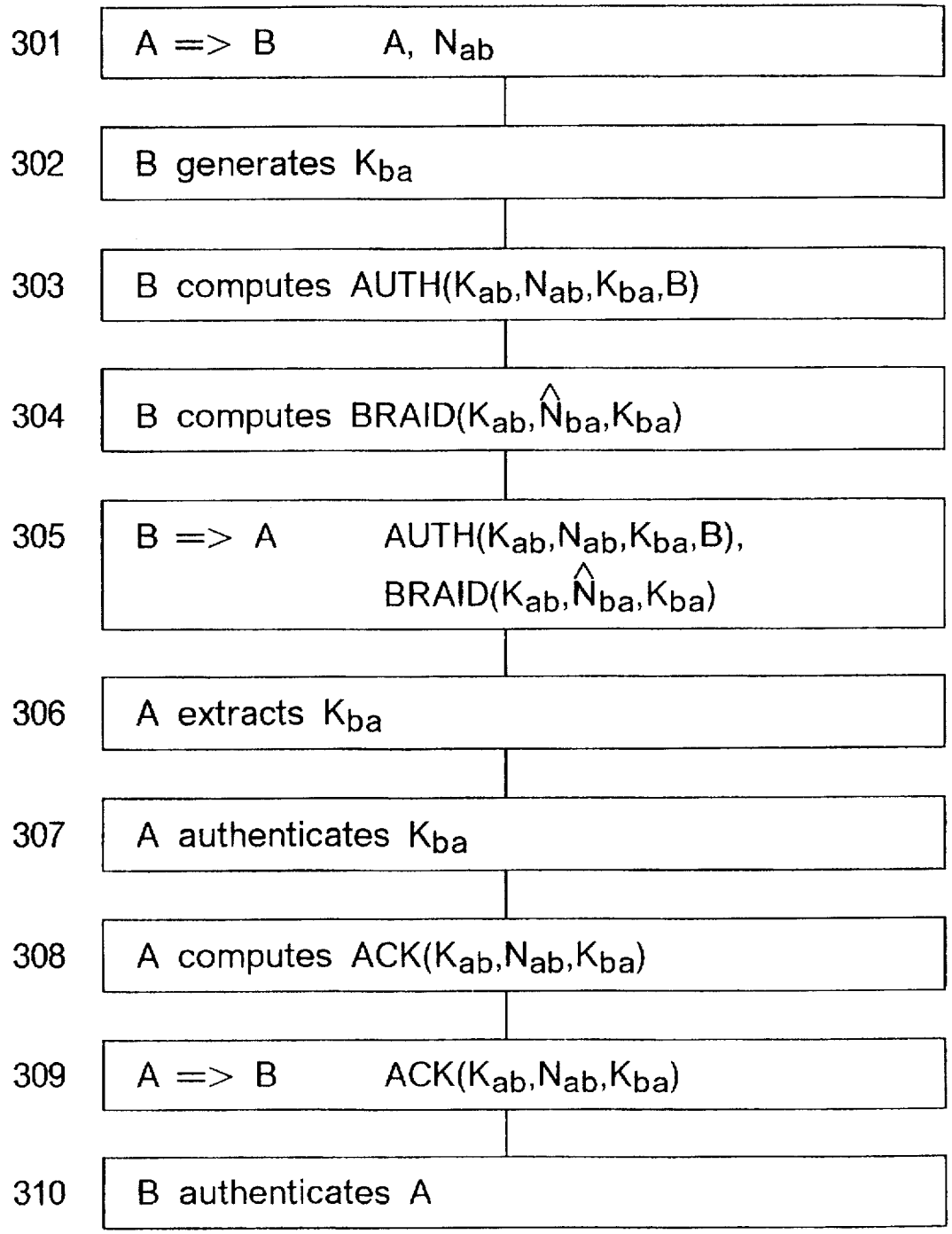
FIG. 3 is a high level logical flow chart illustrating an example of the two-party authentication key distribution protocol according to the present invention.

FIG. 3 depicts an example of a secure two-party authenticated key distribution protocol between two users A and B according to the present invention. It is assumed that A and B share a common key $K_{ab}$ prior to protocol execution.

The protocol execution begins at block 301 with the initiator party A transmitting its identity A and a nonce $N_{ab}$ to the second user B, which can be considered as acting like a server to A. The second user B then generates a new key $K_{ba}$ at block 302, which is held in a secure fashion and meant only to be used by A and B. The value $\ddot{N}_{ba}$ of an authentication function AUTH($K_{ab},N_{ab},K_{ba}$,B), based upon at least the shared key $K_{ab}$, the nonce $N_{ab}$, the new key $K_{ba}$ and the identity of B is computed by the second user B at block 303. The function AUTH($K_{ab},N_{ab},K_{ba}$,B) can be an authentication expression based on the shared key $K_{ab}$; one example of AUTH is (where all encryption is performed with key $K_{ab}$):

$$E(B+e,crc ++ee\ (E(N_{ba}+e,crc ++ee\ E(N_{ab}\ )))).$$

The same user B then computes at block 304 the value of a function BRAID($K_{ab},\ddot{N}_{ba},K_{ba}$), based upon at least the shared key $K_{ab}$, the value $\ddot{N}_{ba}$ of the authentication function AUTH($K_{ab},N_{ab},K_{ba}$,B) and the new key $K_{ba}$. The function BRAID can be an encryption function or a masking expression MASK=$E_{K_{ab}}(\ddot{N}_{ba})$ computed by encryption of the value $\ddot{N}_{ba}$ under the shared key $K_{ab}$, XOR-ed with the new key $K_{ba}$:

$$E_{K_{ab}}(\ddot{N}_{ba})+e,crc ++ee\ K_{ba}.$$

Referring now to block 305, the value of the authentication function AUTH($K_{ab},N_{ab},K_{ba}$,B) and the value of the function BRAID($K_{ab},\ddot{N}_{ba},K_{ba}$) are transmitted from B to A. Upon receiving the message from B, at block 306 the first user A can extract the new key $K_{ba}$ from the value of the function BRAID($K_{ab},\ddot{N}_{ba},K_{ba}$), using the shared key $K_{ab}$ and the value $\ddot{N}_{ba}$. Assuming that the function BRAID is BRAID=$E_{K_{ab}}(\ddot{N}_{ba})$+e,crc ++ee $K_{ba}$, A computes the value of the masking expression MASK=$E_{K_{ab}}(\ddot{N}_{ba})$ and then extracts the new key $K_{ba}$ by XOR-ing the value of the function BRAID=$E_{K_{ab}}(\ddot{N}_{ba})$+e,crc ++ee $K_{ba}$ with the value of the masking expression:

$$K_{ba}=E_{K_{ab}}(\ddot{N}_{ba})+e,crc ++ee\ K_{ba}+e,crc ++ee\ MASK=E_{K_{ab}}(\ddot{N}_{ba})+e,crc ++ee\ K_{ba}+e,crc ++ee\ E_{K_{ab}}(\ddot{N}_{ba})$$

If the user is indeed the user he claims to be by the identity sent to B in block 301, he has the key $K_{ab}$ and can obtain the new key $K_{ba}$. If the user is impersonating the user A, he will not have the key $K_{ab}$, and will not be able to obtain the new key $K_{ba}$. Referring now to block 307, the first user A re-computes the value of the authentication function AUTH ($K_{ab},N_{ab}$, $K_{ba}$,B) and compares it with its counterpad in the message sent by B; a match results in successful, authenticated (and secret) distribution of the new key $K_{ba}$. The process then passes to block 308, where the first user A computes the value of another authentication function ACK ($K_{ab},N_{ab},K_{ba}$), based upon at least the shared key $K_{ab}$, the nonce $N_{ab}$ and the new key $K_{ba}$, in order to complete two-way authentication. The function ACK can be an authentication expression based on the shared key $K_{ab}$; one example of ACK is (where all encryption are performed with key $K_{ab}$):

$E(K_{ba}+e,crc ++ee\ E(N_{ab}))$.

Referring now to block 309, the value of the authentication function $ACK(K_{ab},N_{ab},K_{ba})$ is sent from A to B. The process ends at block 310, where the user B re-computes the value of the authentication function $ACK(K_{ab},N_{ab},K_{ba})$ and compares it with its counterpart in the message sent by A; a match results in authentication of A.

The distinctive feature of the braided structure of the BRAID function is important to achieve both authentication and, at the same time, key distribution. Moreover, the braided structure makes it possible to construct a minimal-length protocol message. This is because it is impossible to distribute an unpredictable random quantity (in secret) and simultaneously authenticate the quantity being distributed with a message of length less than two data units. The proposed two-party key distribution protocol is then extremely compact in both the number and the size of messages and this facilitates its application at any layer in the protocol hierarchy. Furthermore, as described in the following, the protocol is resistant to all interleaving attacks. All this is achieved with minimal computational requirements and without the necessity of using encryption/ decryption functions (which are a stronger cryptographic tool, not always available).

DISCUSSION OF SECURITY

For simplicity and clarity of exposition, we will refer to the example of 2PKDP shown in FIG. 4.

Authentication

The first step in demonstrating the security of the proposed 2PKDP is to show equivalence between it and 2PAP. In other words, we need to support the statement that the proposed protocol provides a means for two-party authentication with security equal to that of 2PAP. If we can prove this equivalence, then it follows that the proposed protocol inherits the basic properties of 2PAP, namely, resistance to interleaving attacks. Of course, protocol goals other than authentication cannot be inherited from 2PAP. In particular, the proposed protocol will be shown to meet the additional requirement of non-disclosure of the key being distributed.

We begin with some initial assumptions about key distribution protocols at large:

A key is always generated by one party.

A key being distributed must be a random, unpredictable quantity. If A and B engage in a 2PKDP and B generates a key, then neither A nor any other party can predict this key.

Keys are never re-used.

These assumptions lead to an important observation that a freshly-generated key is very similar to a nonce; in fact, the only difference between a nonce $N_{ba}$ and a new key $K_{ba}$ is that $N_{ba}$ is communicated in the clear while $K_{ba}$ is kept secret.

We can observe now that the only difference between the two protocols is the so called 'nonce' field of the second message. In 2PAP (202), the nonce field is simply $N_{ba}$, while in 2PKDP (402) it is the more complex braid function expression $E_{K_{ab}}(N_{ba})+e,crc ++ee\ K_{ba}$. The purpose of this expression is to conceal the key, i.e. $K_{ba}$, which is used as a nonce (we consider the question of key confidentiality later). In order to demonstrate the equivalence of respective nonce fields, three issues must be addressed:

Is $K_{ba}$ a nonce?

If $K_{ba}$ is not a true nonce, then the equivalence does not hold. However, as noted earlier, nothing distinguishes a key from a nonce other than the fact that a key is kept secret. In particular, the rules and the procedures of generating keys and nonces are quite the same.

Is $\tilde{N}_{ba}$ a nonce?

Since $K_{ba}$ is a true nonce, $\tilde{N}_{ba}$ is a result of a strong one-way function of (among other variables) $K_{ba}$, we conclude that $\tilde{N}_{ba}$ is also a nonce.

Is there a one-to-one relationship between $E_{K_{ab}}(\tilde{N}_{ba})+e,crc ++ee\ K_{ba}$ and $K_{ba}$?

Or, equivalently, does there exist a distinct value $\tilde{N}_{ba}$ such that: $E_{K_{ab}}(N_{ba})=E_{K_{ab}}(\tilde{N}_{ba})$. Under the assumption that $E_{K_{ab}}$ is a strong encryption function such as DES, this is clearly impossible since, otherwise, decryption would not be one-to-one. If, on the other hand, E is a strong one-way hash function (e.g. MD5) which produces a fixed-size digest of its input, different input values can be hashed into an identical digest. The issue is then the difficulty of computing $\tilde{N}_{ba}$. In MD5, for example, the probability of any given input hashing into a known digest (in our case, even the digest is unknown) is $$\frac{1}{2^{128}}$$

(impossible in practice).

Key-distribution

We now consider key distribution which is the added feature of the proposed 2PKDP. Strong authentication is not sufficient for achieving secure key distribution thus the results of the previous section are not applicable in this context.

The first issue is the definition of secure key distribution. For the purpose of key distribution, a protocol is considered secure if:

Non-disclosure:

The key being distributed cannot be obtained by the adversary (that is, without any assistance from either A or B).

Independence:

Knowledge of one key cannot be used to obtain other keys. Here we assume that the key being distributed will not be subsequently used as the encryption key in another 2PKDP. (The new key may, for example, be used for computing integrity checks on data messages exchanged between A and B).

Integrity:

The key being distributed cannot be modified by the adversary.

Non-disclosure

Assuming no collusion with a legitimate party, disclosure of a key is possible only if the adversary is somehow able to obtain the MASK value i.e., $E_{K_{ab}}(\tilde{N}_{ba})$. However, this is impossible since each MASK is, in effect, a result of a one-way transformation of $\tilde{N}_{ba}$. This implies that the adversary must either: 1) possess the encryption key, $K_{ab}$, or, 2) somehow be able to elicit the desired MASK value from one of the legitimate parties. The former is assumed to be a non-issue while the latter deserves a closer look.

The adversary can try to obtain the MASK value by interrogating B and pretending to be A. However, no matter what value the adversary sends to B, B always generates a fresh key in message (402). It is the freshness of the new key that makes it impossible for the adversary to obtain any useful information. In fact, it is quite irrelevant what the adversary tries to send to B since $\ddot{N}_{ba}$=AUTH $(K_{ab},N_{ab},K_{ba},$ B) is strongly dependent on the freshly-generated $K_{ba}$.

Alternatively, the adversary can try to elicit information from A. This is significantly harder because A responds with message (403) only if message (402) is authentic. Therefore, the adversary must be able to generate expressions of the type in message (402) which is impossible since both cryptographic operations in message (402) are computed over A's random challenge, $N_{ab}$.

Independence

We now suppose that the adversary has somehow managed to discover a key $K_{ba}{}^i$ from one of the runs of 2PKDP. Furthermore, he has done so without any explicit cooperation with either A or B. The most important additional piece of information that the adversary can thereby obtain is: $E_{K_{ab}}($ $\ddot{N}_{ba}{}^i)$=MASK$^i$.

Now, since MASK$^i$ is the encryption of $\ddot{N}_{ba}{}^i$ under the long-term key, $K_{ab}$, the adversary can discover a [plaintext, ciphertext] block-pair which he can later use for trying to break $K_{ab}$. This is, however, a danger commensurate with the presumed breach of security which resulted in the adversary's discovery of $K_{ba}{}^i$.

The remaining question is whether or not the adversary can use the newly-acquired information to attack the protocol by:

1. discovering a key $K_{ba}{}^i$ (i≠j) from any other protocol run (either past or future);
2. successfully distributing $K_{ba}{}^i$ to A in another protocol run while posing as B.

As stated earlier, MASK is a result of a one-way function of $\ddot{N}_{ba}$. Recall also that $\ddot{N}_{ba}$ is, itself, a one-way function of $N_{ab}$, $K_{ba}$ and B. This essentially precludes any possibility of type 1 attacks.

An attack of type 2 requires that the adversary be able to construct a message of the form (i≠j):

$\ddot{N}_{ba}{}^i$=AUTH$(K_{ab},N_{ab}{}^j,K_{ba}{}^i,B)$, $E_{K_{ab}}(\ddot{N}_{ba}{}^i)$+e,crc ++ee $K_{ba}{}^i$ where $K_{ba}{}^j \neq K_{ba}{}^i$.

This, in turn, is possible only if the adversary is able to produce a fresh value of $\ddot{N}_{ba}{}^j$ which includes the computation of the AUTH expression over a fresh nonce $N_{ab}{}^j$. The adversary cannot obtain $\ddot{N}_{ba}{}^i$ via oracle attacks since the party he chooses to interrogate will reply with a message implicitly re-freshed with its own nonce.

Integrity

The integrity of the key being distributed is not one of the foremost security features of a KDP. A pure key distribution protocol need not concern itself with the integrity of the key as long as the key cannot be modified to a particular value selected by the adversary. For example, some KDPs known in the art, as described in R. Bird at al. are vulnerable to key modification attacks since the key itself is not authenticated but, rather, only distributed. Nonetheless, this is not considered to be a bug in the protocol because the adversary cannot change the key to a known value; he can only offset a key by a known value.

On the other hand, attacks of this sod are not feasible with the present 2PKDP since key modification requires simultaneous modification of the authentication expression: AUTH$(K_{ab},N_{ab},K_{ba},B)$.

THREE-PARTY KEY DISTRIBUTION PROTOCOL (3PKDP)

Figure 5A:
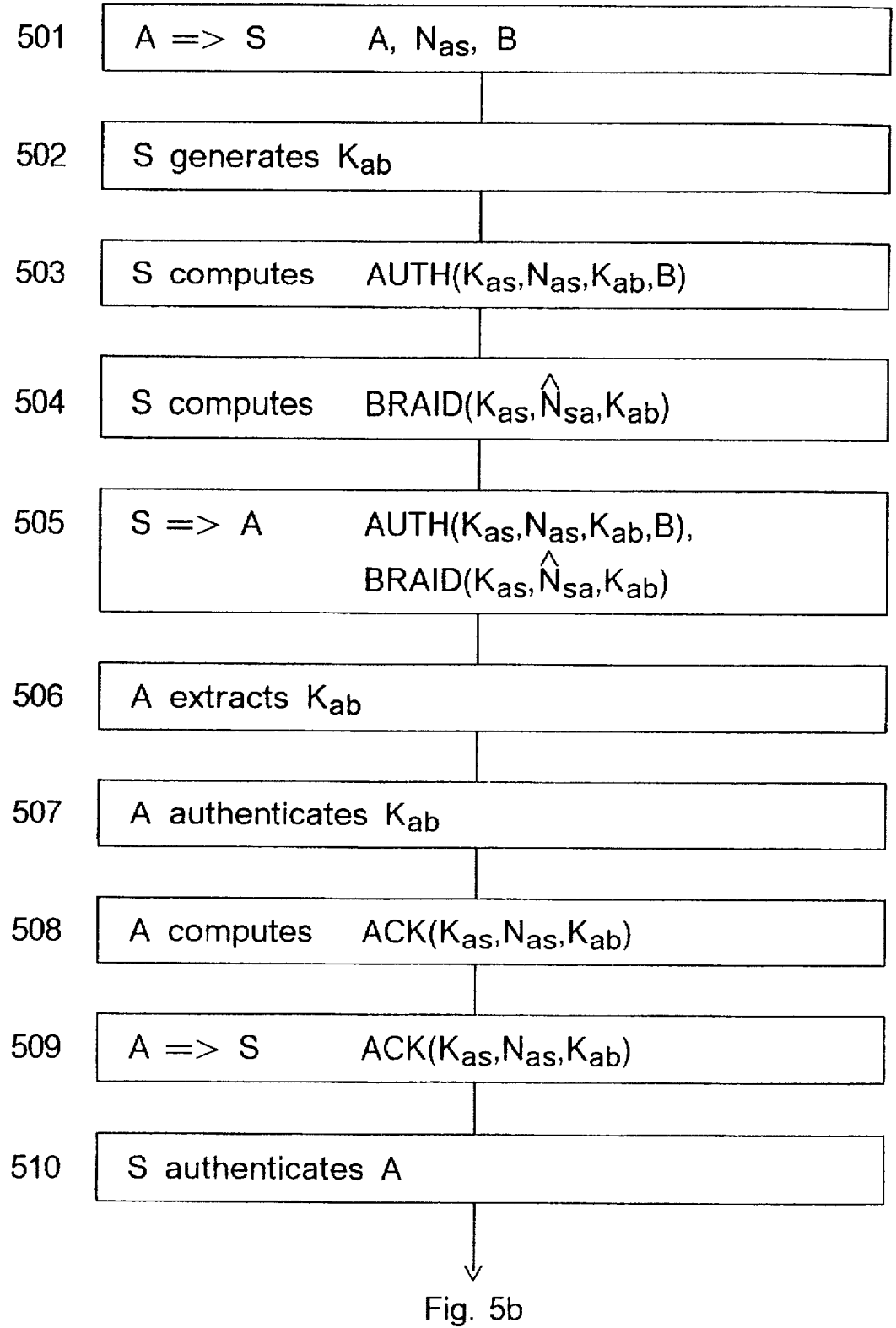
FIG. 5 is a high level logical flow chart illustrating an example of the three-party authentication key distribution protocol according to the present invention.
Figure 5B:
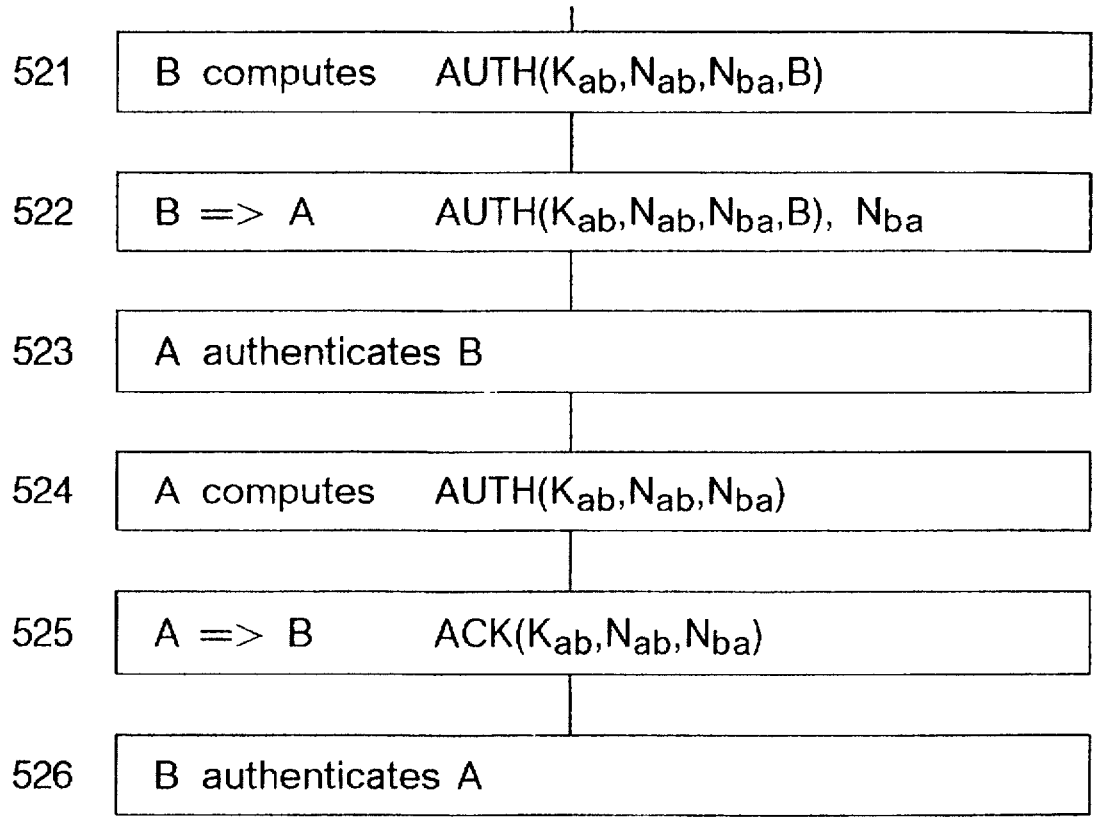

FIG. 5 depicts a high level logical flow chart of a three-party authenticated key distribution protocol according to the present invention. The objective of a 3PKDP is to distribute a fresh group key to a group of users (two parties in this case). It is assumed that there exists a mutually-trusted third party typically referred to as the authentication server (S). It is assumed that all the users of the group share a corresponding secret master user key prior to protocol execution ($K_{as}$ for A-S and $K_{bs}$ for B-S). Each of said user key is know only to the server and the corresponding user. In the protocol of this example there is an initiator, denoted as A, which starts the communication. It is assumed that the group is determined in such a way that A knows who takes part in it. The protocol is started by the initiator A who first identifies the other parties (users) in the group.

A secure 3PKDP must satisfy much the same conditions as a secure 2PKDP with one added requirement:

Neither party must be able to alter the group key being distributed.

More generally, we assume that one of the legitimate parties (A or B) may exhibit arbitrary 'byzantine' behavior (that it could impersonate another party that is registered with S). Of course, not all types of such threats can be addressed within the protocol. For example, unauthorized disclosure of a session key cannot be prevented. However, a secure 3PKDP must be defended against attacks by a legitimate party. In fact, a legitimate party exhibiting byzantine behavior can be viewed as a special case of an adversary (one armed with additional knowledge).

We obtain a secure 3PKDP by combining two instances (runs) of 2PKDP and one instance of 2PAP. Two users A and B each engage in a 2PKDP with the authentication server S. A and B are each assumed to share a user secret key with S, i.e., $K_{as}$ and $K_{bs}$. After the distribution of the new key $K_{ab}$, A and B engage in a 2PAP in order to confirm each other's knowledge of $K_{ab}$.

Referring now to block 501, the protocol execution begins with a first user A transmitting its identity A, a nonce $N_{as}$ and the identity of the users (only B in this case) of the group other than A to the server S. The server then generates a new group key $K_{ab}$ at block 502, which is held in a secure fashion and meant only to be used by the users of the group (A and B in this example). The value $\ddot{N}_{sa}$ of an authentication function AUTH$(K_{as},N_{as},K_{ab},B)$, based upon at least the user's key $K_{as}$, the user's nonce $N_{as}$, the group key $K_{ab}$ and the identity of the users (B in this case) of the group other than A is computed by the server at block 503. The server S then computes at block 504 the value of a function BRAID $(K_{as},\ddot{N}_{sa},K_{ab})$, based upon at least the user's $k_{as}$, the value $\ddot{N}_{sa}$ and the group key $K_{ab}$.

Referring now to block 505, the value of the authentication function AUTH$(K_{as},N_{as},K_{ab},B)$ and the value of the function BRAID$(K_{as},\ddot{N}_{sa},K_{ab})$ are transmitted from S to A. Upon receiving the message from S, at block 506 the first user A can extract the group key $K_{ab}$ from the value of the user's function BRAID$(K_{as},\ddot{N}_{sa},K_{ab})$, using the user's key $K_{as}$ and the value $\ddot{N}_{sa}$.

Referring now to block 507, the first user A re-computes the value of the user's authentication function AUTH$(K_{as},N_{as},K_{ab},B)$ and compares it with its counterpad in the message sent by S; a match results in successful, authenticated (and secret) distribution of the group key $K_{ab}$. The process then passes to block 508, where the first user computes the value of another authentication function ACK $(K_{as},N_{as},K_{ab})$, based upon at least the user's key $K_{as}$, the user's nonce $N_{as}$ and the group key $K_{ab}$, in order to complete two-way authentication.

Referring now to block 509, the value of the authentication function ACK$(K_{as},N_{as},K_{ab})$ is sent from A to S. The first 2PKDP ends at block 510, where the server S re-computes the value of the authentication function ACK($K_{as}$,$N_{as}$,$K_{ab}$) and compares it with its counterpad in the message sent by A; a match results in authentication of A.

Similar steps are now performed between the second user B and the server S. Referring to block 511, the second user B transmits its identity B, a nonce $N_{bs}$ and the identity of the users (only A in this case) of the group other than B to the server S. The value $\ddot{N}_{sb}$ of an authentication function AUTH ($K_{bs}$,$N_{bs}$,$K_{ab}$,A), based upon at least the user's key $K_{bs}$, the user's nonce $N_{bs}$, the group key $K_{ab}$ and the identity of the users (A in this case) of the group other than B is computed by the server at block 512. The server S then computes at block 513 the value of a function BRAID($K_{bs}$,$\ddot{N}_{sb}$,$K_{ab}$), based upon at least the user's key $K_{bs}$, the value $\ddot{N}_{sb}$ and the group key $K_{ab}$.

Referring now to block 514, the value of the authentication function AUTH($K_{bs}$,$N_{bs}$,$K_{ab}$,A) and the value of the function BRAID($K_{bs}$,$\ddot{N}_{sb}$,$K_{ab}$) are transmitted from S to B. Upon receiving the message from S, at block 515 the second user B can extract the group key $K_{ab}$ from the value of the user's function BRAID($K_{bs}$,$\ddot{N}_{sb}$,$K_{ab}$), using the user's key $K_{bs}$ and the value $\ddot{N}_{sb}$.

Referring now to block 516, the second user B re-computes the value of the user's authentication function AUTH($K_{bs}$,$N_{bs}$,$K_{ab}$,A) and compares it with its counterpart in the message sent by S; a match results in successful, authenticated (and secret) distribution of the group key $K_{ab}$. The process then passes to block 517, where the second user computes the value of another authentication function ACK ($K_{bs}$,$N_{bs}$,$K_{ab}$), based upon at least the user's key $K_{bs}$, the user's nonce $N_{bs}$ and the group key $K_{ab}$, in order to complete two-way authentication.

Referring now to block 518, the value of the authentication function ACK($K_{bs}$,$N_{bs}$,$K_{ab}$) is sent from B to S. The second 2PKDP ends at block 519, where the server S re-computes the value of the authentication function ACK ($K_{bs}$,$N_{bs}$,$K_{ab}$) and compares it with its counterpad in the message sent by B; a match results in authentication of B. The two users A and B then can authenticate each other by a 2PAP. Referring to block 520, the first user A transmits its identity A and a nonce $N_{ab}$ to the second user B. Upon receiving the message from A, the value of the authentication function AUTH($K_{ab}$,$N_{ab}$,$N_{ba}$,B), based upon at least the group key $K_{ab}$, the nonce $N_{ab}$, a new nonce $N_{ba}$ and the identity B of the message originator is computed by the second user B at block 521.

Referring now to block 522, the value of the authentication function AUTH($K_{ab}$,$N_{ab}$,$N_{ba}$,B) and the nonce $N_{ba}$ are transmitted from B to A. Upon receiving the message from B, at block 523 the first user A re-computes the value of the authentication function AUTH($K_{ab}$,$N_{ab}$,$N_{ba}$,B) and compare it with its counterpad in the message sent by B; a match results in authentication of B. The process then passes to block 524, where the first user computes the value of the authentication function ACK($K_{ab}$,$N_{ab}$,$N_{ba}$), based upon at least the group key $K_{ab}$, the nonce $N_{ab}$ and the nonce $N_{ba}$, in order to complete two-way authentication.

Referring now to block 525, the value of the authentication function ACK($K_{ab}$,$N_{ab}$,$N_{ba}$) is sent from A to B. The process ends at block 526, where the second user B re-computes the value of the authentication function ACK ($K_{ab}$,$N_{ab}$,$N_{ba}$) and compare it with its counterpad in the message sent by A; a match results in authentication of A.

We note that the server can also play the role of a user (in addition to server). The server can use the protocol to share a key with a group which contains the server itself (as a member of the group), in which case the server can play both the role of the protocol server and the role of the user, omitting sending the group key and authentication verification to itself (which is not needed), but only to a sub-group of users consisting of the users of the group other than the server S. In particular, this can be used to refresh the keys shared by the server and a user in a reliable way that makes sure that only the server and the actual user can change the key they share. We note that if the group consists only of two users (e.g., A and S), the protocol becomes equal to the described 2PKDP.

DISCUSSION OF SECURITY

Figure 6:
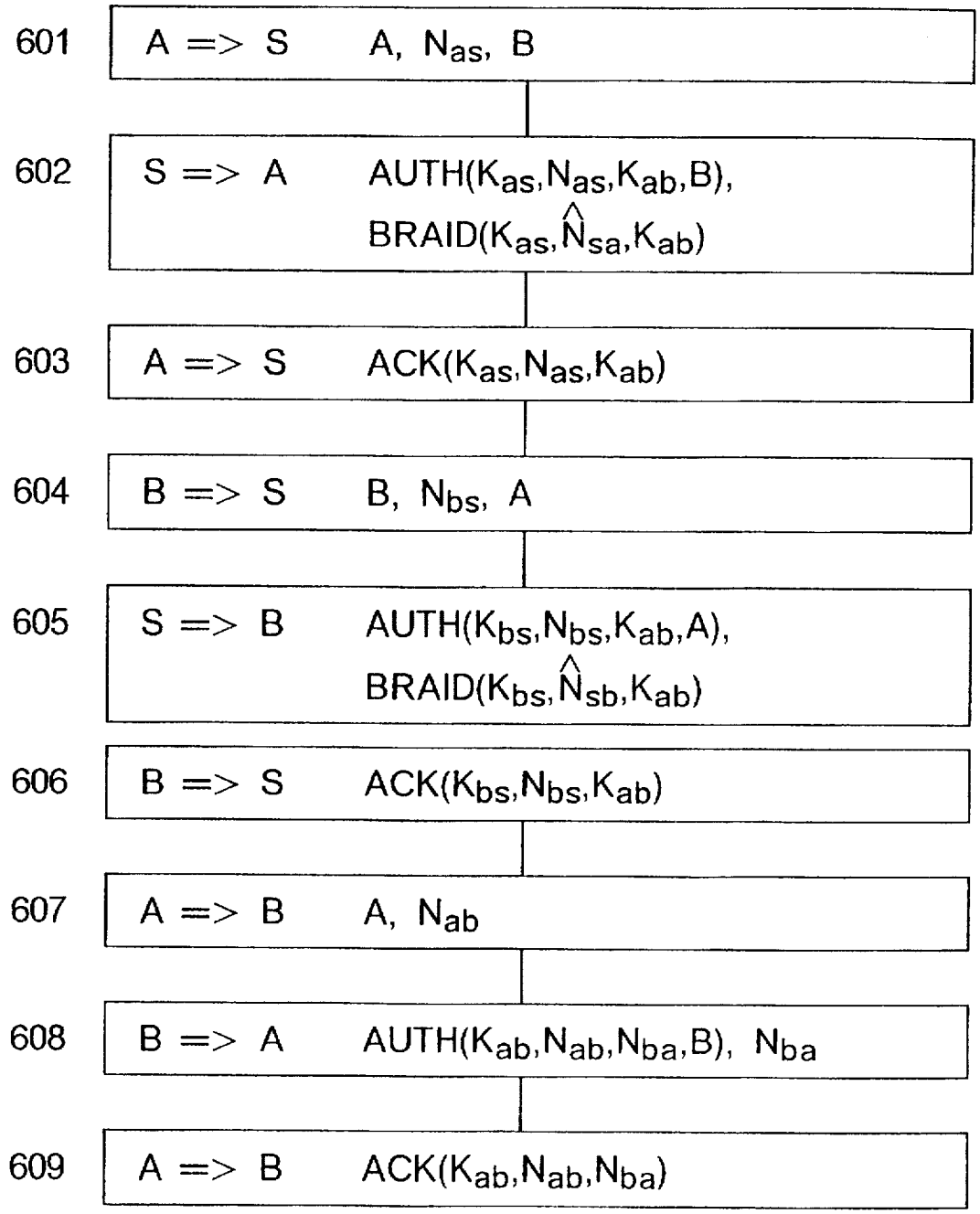
FIG. 6 depicts the message flow of an example of 3PKDP according to the present invention.

For simplicity and clarity of exposition, we will refer to the example of 3PKDP shown in FIG. 6.

Authentication

As with 2PKDP, the first issue we must address is the strength of 3PKDP as an authentication protocol. In other words, does the protocol achieve pairwise authentication of (A,S), (B,S) and, finally, (A,B)?

Starting from the end of the protocol, it can be easily seen that, assuming secure distribution of $K_{ab}$, the authentication protocol between A and B is as secure as the underlying 2PAP (in fact, it is 2PAP.)

Viewed in isolation, 2PKDP between A and S is secure and so is 2PKDP between B and S. However, one important difference between 3PKDP and two unrelated runs of 2PKDP is that the nonce generated by S is the same in both runs of 2PKDP (i.e., $K_{ab}$). This is not a problem as long as it can be shown that the respective AUTH expressions remain uniquely 'tied' to the particular run of 3PKDP. We address this issue by explicitly including the name of the peer party in the calculation of each AUTH expression, i.e., B is included in AUTH with $K_{as}$ and A in AUTH with $K_{bs}$. While this argument is not particularly crisp, we note that one simple method for complete conformance with 2PKDP is to use $K_{ab}$+e.crc ++ee A instead of $K_{ab}$ in AUTH with $K_{as}$ and, similarly, $K_{ab}$+e.crc ++ee B instead of $K_{ab}$ in AUTH with $K_{bs}$.

Key distribution

The non-disclosure and independence properties in 3PKDP are inherited directly from 2PKDP. The integrity of the new key is a different matter. The side-effect of the same key being distributed to both parties, is that an 'insider' adversary, say B, can obtain the expression used to mask the key in the message from S to A. $MASK_a = E_{K_{as}}(\ddot{N}_{sa}) = E_{Kas}(AUTH(K_{as},N_{as},K_{ba},B))$.

At the first glance, it appears that knowledge of this expression allows B to modify $K_{ab}$ to any selected $\overline{K}_{ab}$ with impunity. Nonetheless, the AUTH with $K_{as}$ expression (enclosed in the same message) precludes this attack since B cannot alter AUTH($K_{as}$,$N_{as}$,$K_{ab}$,B) to be AUTH($K_{as}$,$N_{as}$, $\overline{K}_{ab}$,B)

On a related note, one advantage that B does gain as a result of 3PKDP is the knowledge of the cleartext-ciphertext pair of the form: $\ddot{N}_{sa}$, $E_{K_{as}}(\ddot{N}_{sa})$. This poses a threat insofar as B is able to discover $K_{as}$ by means of a brute-force attack. However, the amount of work required on the average remains considerable, certainly commensurate with what would be required to crack an AUTH expression in the first place.

MULTI-PARTY KEY DISTRIBUTION PROTOCOL

Figure 7A:
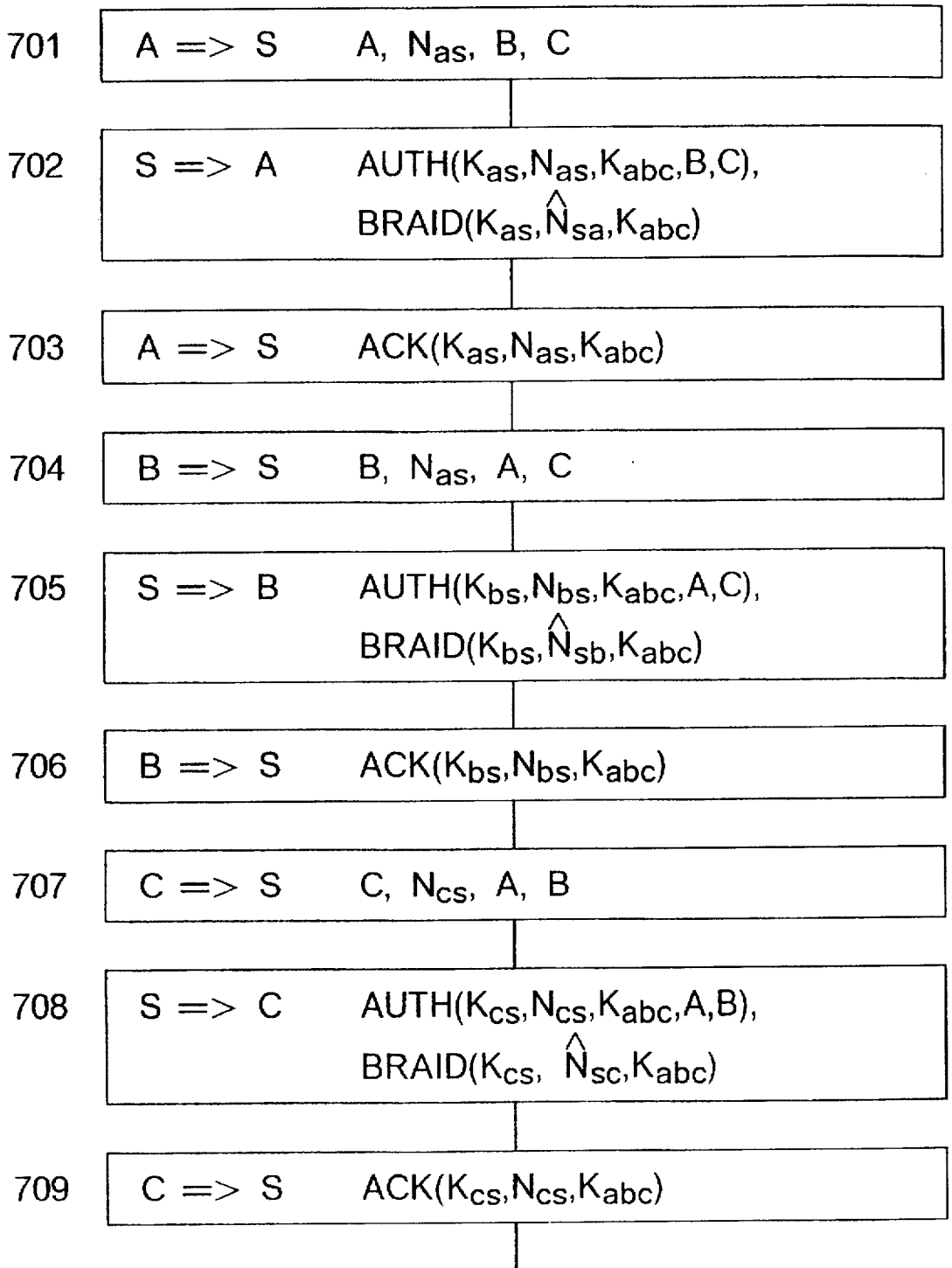
FIG. 7 depicts the message flow of an example of MPKDP according to the present invention.
Figures 7A, 7B:
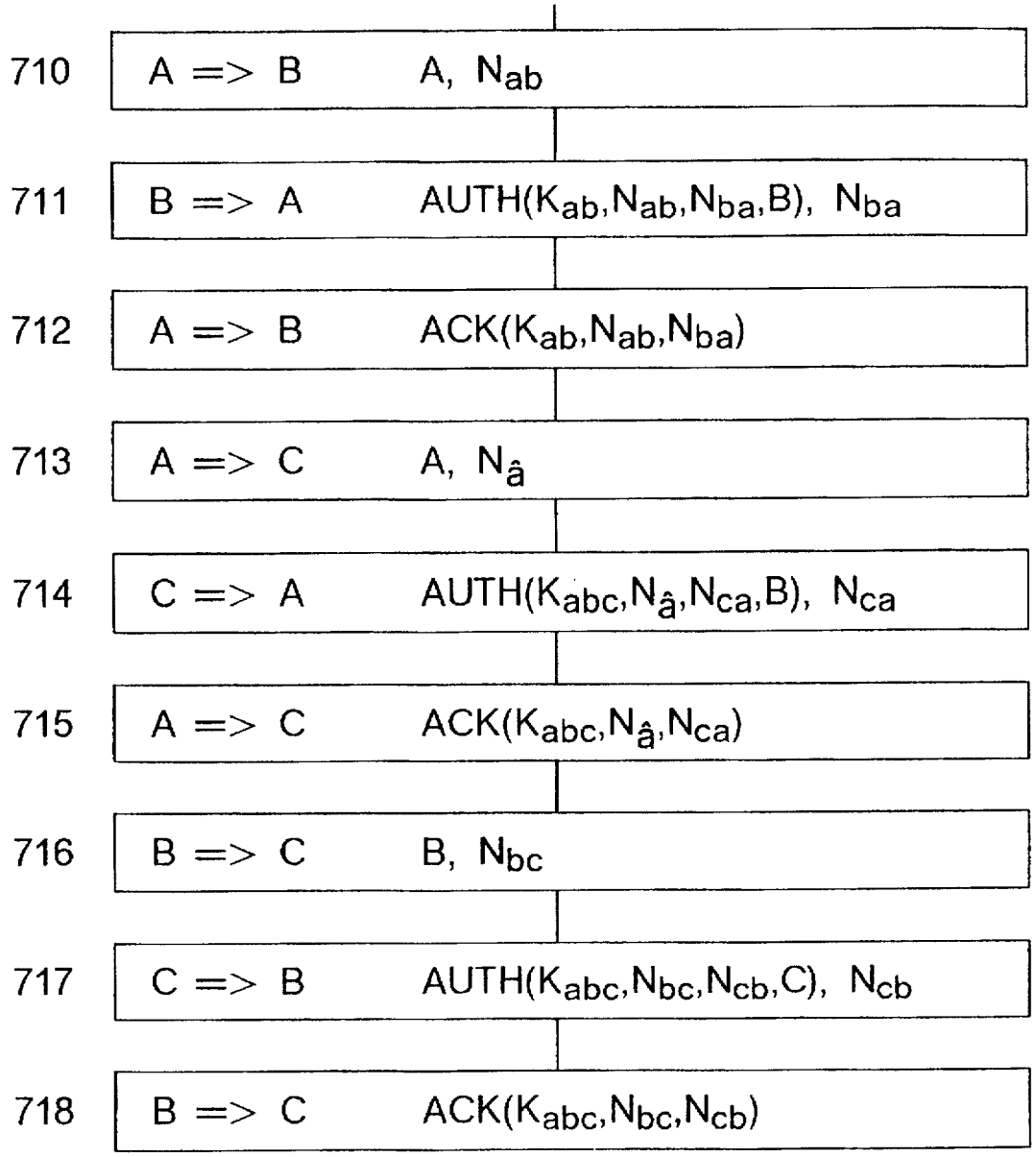

FIG. 7 depicts the list of the messages exchanged in an example of a secure multi-party authenticated key distribution protocol from a server S to a group of selected users (A, B and C in the example) according to the present invention. In the protocol of this example there is an initiator, denoted as A, which starts the communication. It is assumed that the group is determined in such a way that A knows who is pad of it. It is also assumed that all users of the group share a corresponding secret user key prior to protocol execution ($K_{as}$ for A-S, $K_{bs}$ for B-S and $K_{cs}$ for C-S). Each of said user keys is known only to the server and a corresponding one of the users. The protocol is started by the initiator A who first identifies the other parties (users) in the group.

The actual process flow implementing the above protocol messages can be plainly derived from FIG. 7.

In FIG. 7, the Multi-Party Key Distribution Protocol (MPKDP) is obtained by combining three runs of 2PKDP: A-S, B-S, and C-S with three runs of 2PAP: A-B, A-C, B-C. The goal of the MPKDP is to distribute to all parties the new key $K_{abc}$. After receiving $K_{abc}$, A-B, A-C, and B-C engage in a 2PAP to confirm each other's knowledge of $K_{abc}$.

Referring to blocks 701,704 and 707, each of A, B and C, sends to server S its identity, its own nonce ($N_{as}$, $N_{bs}$, $N_{cs}$), and the identities of other group members: (B,C) for A, (A,C) for B and (A,B) for C.

Referring to blocks 702,705 and 708, server S generates a new key $K_{abc}$ which is held in a secure fashion and is meant only to be used by the members of the group (A, B, and C in this example.) The values of $\ddot{N}_{sa}$, $\ddot{N}_{sb}$, and $\ddot{N}_{sc}$ are: AUTH($K_{as}$,$N_{as}$,$K_{abc}$,B,C), AUTH($K_{bs}$,$N_{bs}$,$K_{abc}$,A,C) and AUTH($K_{cs}$,$N_{cs}$,$K_{abc}$,A,B), respectively. Each is based upon at least the user's key ($K_{as}$, $K_{bs}$ or $K_{cs}$), the user's nonce ($N_{as}$, $N_{bs}$, or $N_{cs}$), the group key $K_{abc}$, and the identities of other group members ((B,C), (A,C) or (A,B)).

Server S also computes the value of the functions: BRAID ($K_{as}$,$\ddot{N}_{sa}$,$K_{abc}$), BRAID($K_{bs}$,$\ddot{N}_{sb}$,$K_{abc}$), and BRAID($K_{cs}$, $\ddot{N}_{sc}$,$K_{abc}$). Each of these functions is computed as in the description of 3PKDP.

Finally, server S sends out to A: AUTH($K_{as}$,$N_{as}$,$K_{abc}$,B, C) and BRAID($K_{as}$,$\ddot{N}_{sa}$,$K_{abc}$); to B: AUTH($K_{bs}$,$N_{bs}$,$K_{abc}$, A,C) and BRAID($K_{bs}$,$\ddot{N}_{sb}$,$K_{abc}$); to C: AUTH($K_{cs}$,$N_{cs}$,$K_{abc}$, A,B) and BRAID($K_{cs}$,$\ddot{N}_{sc}$,$K_{abc}$). Each of A, B, and C verifies its respective message and extracts the new key $K_{abc}$.

Referring to blocks 702, 705 and 709, each user A, B, and C computes and sends to server S, respectively, the value of ACK($K_{as}$,$N_{as}$,$K_{abc}$), ACK($K_{bs}$,$N_{bs}$,$K_{abc}$) and ACK($K_{cs}$,$N_{cs}$, $K_{abc}$) whereof each is based upon at least the user's key ($K_{as}$, $K_{bs}$, $K_{cs}$), the user's nonce ($N_{as}$, $N_{bs}$ or $N_{cs}$), and the group key $K_{abc}$. Upon receipt of all three messages, S verifies each one using the corresponding values. This completes the authenticated key distribution.

The remainder of the protocols (blocks 710 through 718) is devoted to three runs of 2PAP to confirm to each of the three group members that the other members hold the new key $K_{abc}$. Each of the 2PAP runs A-B, A-C, and B-C is identical to that in FIG. 2.

OPTIMIZATION

The protocol shown in FIG. 6 (similar considerations can be made about the protocol of FIG. 7) was obtained by a straightforward combination of 2PKDPs and 2PAPs. It requires a total of 9 messages and 3 bi-directional communication flows (A-B, A-S, B-S). In order to reduce the number of messages and optimize the protocol some of the messages can be interleaved. Moreover, it is not necessary for both A and B to communicate with S directly. A more realistic scenario would be such that all communication with S is either through A or B.

Figure 8:
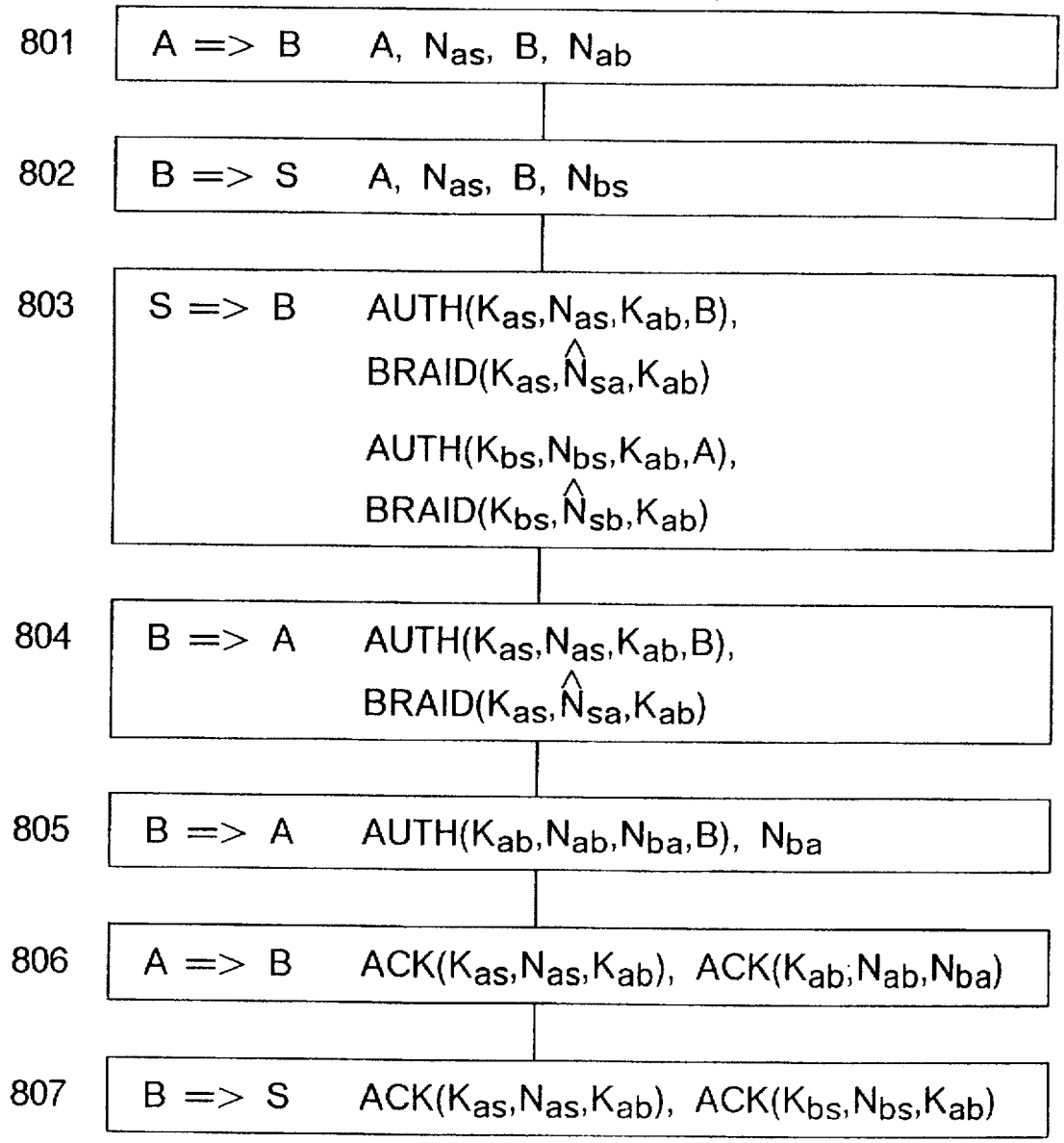
FIG. 8 depicts the message flow of an example of an optimized 3PKDP according to the present invention.

Referring now to FIG. 8, there is depicted a compacted version of a 3PKDP. In this example A starts the execution, then passes its information to B which passes A's information to S together with B's information. In a counter-move, the server S sends all the information to B, that distributes its piece of information to A. In order to make the protocol insensitive to the order of communication inside the group of users communicating with each other, tags are used so that a particular user knows which particular piece of information it is to use in a stream of data.

Referring now to block 801, the protocol execution begins with an initiating user, A, transmitting his identity, his nonce for S ($N_{as}$), his nonce for B ($N_{ab}$) and the name of the other user (B) to that user B.

At block 802, upon receipt of the information from user A, user B transmits to S his own identity, the identity of the other use (A), his nonce for S ($N_{bs}$) and A's nonce for S ($N_{as}$).

Referring now to block 803, server S generates a new key $K_{ab}$ which is held in a secure fashion and meant only to be used by A and B. The value $\ddot{N}_{sa}$ of an authentication function AUTH($K_{as}$,$N_{as}$,$K_{ab}$,B) based upon at least the user's key $K_{as}$, the user's nonce $N_{as}$, the new key $K_{ab}$, and the identity of the other user B is computed. Server S then computes the value of a function BRAID($K_{as}$,$\ddot{N}_{sa}$,$K_{ab}$), based upon at least the user's key $K_{as}$, the value $\ddot{N}_{sa}$, and the new key $K_{ab}$.

Referring still to block 803, server S also computes the value authentication function AUTH($K_{bs}$,$N_{bs}$,$K_{ab}$,A) based upon at least the user's key $K_{bs}$, the user's nonce $N_{bs}$, the new key $K_{ab}$, and the identity of the other user A. Server S then computes the value of a function BRAID($K_{bs}$, $\ddot{N}_{sb}$,$K_{ab}$), based upon at least the user's key $K_{bs}$, the value $\ddot{N}_{sb}$, and the new key $K_{ab}$. Finally, server S transmits AUTH($K_{as}$,$N_{as}$,$K_{ab}$,B), BRAID($K_{as}$,$\ddot{N}_{sa}$,$K_{ab}$), AUTH($K_{bs}$, $N_{bs}$,$K_{ab}$,A) and BRAID($K_{bs}$,$\ddot{N}_{sb}$,$K_{ab}$) to B.

Referring now to block 804, user B receives the above message and extracts the new key $K_{ab}$ from the value of the user's function BRAID($K_{bs}$,$\ddot{N}_{sb}$,$K_{ab}$) using the key $K_{bs}$ and the value AUTH($K_{bs}$,$N_{bs}$,$K_{ab}$,A). Then, B authenticates the new key $K_{ab}$ by verifying the authentication function AUTH ($K_{bs}$,$N_{bs}$,$K_{ab}$,A) based upon at least the user's key $K_{bs}$, the value $N_{bs}$, the new key $K_{ab}$, and the identity of the other user A.

Then, B computes the value AUTH($K_{ab}$,$N_{ab}$,$N_{ba}$,B) based upon at least the new key $K_{ab}$, A's nonce $N_{ab}$, B's nonce $N_{ba}$ and the identity of B. At the end of block 804, B transmits AUTH($K_{as}$,$N_{as}$,$K_{ab}$,B), BRAID($K_{as}$,$\ddot{N}_{sa}$,$K_{ab}$) to A. At block 805, B transmits AUTH($K_{ab}$,$N_{ab}$,$N_{ba}$,B) and its nonce $N_{ba}$ to A. Referring to block 806, user A receives the above message and extracts the new key $K_{ab}$ from the value of the user's function BRAID($K_{as}$,$\ddot{N}_{sa}$,$K_{ab}$) using the key $K_{as}$ and the value AUTH($K_{as}$,$N_{as}$,$K_{ab}$,B). Then, A authenticates the new key $K_{ab}$ by verifying the authentication function AUTH ($K_{as}$,$N_{as}$,$K_{ab}$,B) based upon at least the user's key $K_{as}$, the value $N_{as}$, the new key $K_{ab}$, and the identity of the other user B.

Then, A verifies the received value AUTH($K_{ab}$,$N_{ab}$,$N_{ba}$, B) based upon at least the new key $K_{ab}$, A's nonce $N_{ab}$, B's nonce $N_{ba}$, and the identity of B.

Still referring to block 806, user A computes the value of another authentication function ACK($K_{as}$,$N_{as}$,$K_{ab}$) based at least on the user's key $K_{as}$, the user's nonce for S ($N_{as}$), and the new key $K_{ab}$ in order to complete two-way authentication between A and S. User A also computes yet another authentication function ACK($K_{ab}$,$N_{ab}$,$N_{ba}$) based upon at least the new key $K_{ab}$, A's nonce for B $N_{ab}$, and B's nonce for A $N_{ba}$. At the end of block 806, user A transmits to B ACK($K_{as}$,$N_{as}$,$K_{ab}$) and ACK($K_{ab}$,$N_{ab}$,$N_{ba}$).

Referring now to block 807, user B receives ACK($K_{as}$, $N_{as}$,$N_{ab}$) and ACK($K_{ab}$,$N_{ab}$,$N_{ba}$). First, user B recomputes the value of the function ACK($K_{ab}$,$N_{ab}$,$N_{ba}$) and compares it with its counterpad in the messages received from A; a match results in the authentication of A.

User B now computes the value of another authentication function ACK($K_{bs}$,$N_{bs}$,$K_{ab}$) based at least on the user's key $K_{bs}$, the user's nonce for S ($N_{bs}$), and the new key $K_{ab}$ in order to complete two-way authentication between B and S. Then, user B transmits to S ACK($K_{as}$,$N_{as}$,$K_{ab}$) and ACK ($K_{bs}$,$N_{bs}$,$K_{ab}$).

Referring still to block 807, server S receives ACK($K_{as}$, $N_{as}$,$K_{ab}$) and ACK($K_{bs}$,$N_{bs}$,$K_{ab}$) sent by B. Server S first recomputes the value of the authentication function ACK ($K_{as}$,$N_{as}$,$K_{ab}$) and compares it with its counterpad in the message received from B; a match results in the authentication of A. Next, server S first recomputes the value of the authentication function ACK($K_{bs}$,$N_{bs}$,$K_{ab}$) and compares it with its counterpad in the message received from B; a match results in the authentication of B. This completes the protocol.

We claim:

1. A method for providing secure, authenticated distribution in a communication system of a key to be used by a group of selected users, the key being distributed from a server to a sub-group consisting of the users of said group other than said server, each user of said sub-group sharing a secret user key with said server, said method comprising the steps of:

transmitting (501,511) the user's identification (A), a user's nonce ($N_{as}$) and an identification (B) of a user of said sub-group other than said transmitting user from each user of said sub-group to said server through an available path of said system;

generating (502) a new, common group key ($K_{ab}$) for all users of said group by said server;

computing (503,512) the value of a first function for each user of said sub-group by said server, said first function depending upon at least said user's key ($K_{as}$), said user's nonce ($N_{as}$), said group key ($K_{ab}$) and the identification (B) of the user of said group other than said user;

computing (504,513) the value of a second function for each user of said sub-group by said server, said second function depending upon at least said user's key ($K_{as}$), the value of said user's first function and said group key ($K_{ab}$);

transmitting (505,514) the values of said user's first and second functions from said server to each user of said sub-group through an available path of said system;

extracting (506,515) said group key, by each user of said sub-group, from the value of said user's second function, employing said user's key and the value of said user's first function; and re-computing (507,516) the value of said user's first function by each user of said sub-group and considering authenticated said extracted group key ($K_{ab}$) if said re-computed value is equal to the value of said user's first function received by said server.

2. The method according to claim 1, further comprising the steps of:

computing (508,517) the value of a third function by each user of said sub-group, said user's third function depending upon at least said user's key ($K_{as}$), said user's nonce ($N_{as}$) and said group key ($K_{ab}$);

transmitting (509,518) the value of said user's third function from each user of said sub-group to said server through an available path of said system; and re-computing (510,519) the value of said user's third function for each user of said sub-group by said server and authenticating each user of said sub-group if said re-computed value if equal to the value of said user's third function received by said user.

3. The method according to claims 1 or 2, further comprising the step of:

each user of said sub-group authenticating (520 to 526) itself to any other user of said sub-group by encrypting and exchanging information with said group key ($K_{ab}$) between said users.

4. The method according to claims 1 or 2, wherein said first, second and third functions are encryption functions under said user's key ($K_{as}$).

5. The method according to claims 1 or 2, wherein said second function is an encryption function under said user's key ($K_{as}$) of at least said user's first function, exclusively OR-ed with said group key ($K_{ab}$).

6. The method according to claim 5, wherein said group key ($K_{ab}$) is extracted by each user of said sub-group by re-computing the value of said user's encryption function and XOR-ing said result with the value of said user's second function.

7. The method according to claims 1 or 2, further characterized in that:

the information to be transmitted from each user of said sub-group to the server is collected by one of the users of the system and then transmitted from said one user to said server.

8. The method according to claims 1 or 2, further characterized in that:

the information to be transmitted over the system is identified by a tag identifying the addressed user or server.

9. A communication system (100) for providing secure, authenticated distribution of a key to be used by a group of selected users (101,102,103,109), the key being distributed from a server (109) to a sub-group of users (101,102,103) consisting of the users of said group other than said server, each user of said sub-group sharing a corresponding secret user key with said server, said system comprising:

means for transmitting (501,511) the user's identification, a user's nonce and an identification of a user of said sub-group other than said user from each user of said sub-group to said server through an available path of said system;

means for generating (502) a new, common group key for all users of said group by said server;

means for computing (503,512) the value of a first function for each user of said sub-group by said server, said first function depending upon at least said user's key, said user's nonce, said group key and the identification of the user of said group other than said user;

means for computing (504,513) the value of a second function for each user of said sub-group by said server, said second function depending upon at least said user's key, the value of said user's first function and said group key;

means for transmitting (505,514) the values of said user's first and second functions from said server to each user of said sub-group through an available path of said system;

means for extracting (506,515) said group key, by each user of said sub-group, from the value of said user's second function, employing said user's key and the value of said user's first function; and means for re-computing (507,516) the value of said user's first function by each user of said sub-group and considering authenticated said extracted group key if said re-computed value is equal to the value of said user's first function received by said server.

10. The communication system according to claim 9, further comprising:

means for computing (508,517) the value of a third function by each user of said sub-group, said user's third function depending upon at least said user's key, said user's nonce and said group key;

means for transmitting (509,518) the value of said user's third function from each user of said sub-group to said server through an available path of said system; and means for re-computing (510,519) the value of said user's third function for each user of said sub-group by said server and authenticating each user of said sub-group if said re-computed value is equal to the value of said user's third function received by said user.

11. The method according to claim 3, wherein said first, second and third functions are encryption functions under said user's key ($K_{as}$).

12. The method according to claim 3, wherein said second function is an encryption function under said user's key ($K_{as}$) of at least said user's first function, exclusively OR-ed with said group key ($K_{ab}$).

13. The method according to claim 4, wherein said second function is an encryption function under said user's key ($K_{as}$) of at least said user's first function, exclusively OR-ed with said group key ($K_{ab}$).

14. The method according to claim 3, further characterized in that:

the information to be transmitted from each user of said sub-group to the server is collected by one of the users of the system and then transmitted from said one user to said server.

15. The method according to claim 4, further characterized in that:

the information to be transmitted from each user of said sub-group to the server is collected by one of the users of the system and then transmitted from said one user to said server.

16. The method according to claim 5, further characterized in that:

the information to be transmitted from each user of said sub-group to the server is collected by one of the users of the system and then transmitted from said one user to said server.

17. The method according to claim 6, further characterized in that:

the information to be transmitted from each user of said sub-group to the server is collected by one of the users of the system and then transmitted from said one user to said server.

18. The method according to claim 3, further characterized in that:

the information to be transmitted over the system is identified by a tag identifying the addressed user or server.

19. The method according to claim 4, further characterized in that:

the information to be transmitted over the system is identified by a tag identifying the addressed user or server.

20. The method according to claim 5, further characterized in that:

the information to be transmitted over the system is identified by a tag identifying the addressed user or server.

21. The method according to claim 6, further characterized in that:

the information to be transmitted over the system is identified by a tag identifying the addressed user or server.

22. The method according to claim 7, further characterized in that:

the information to be transmitted over the system is identified by a tag identifying the addressed user or server.

* * * * *